（12） United States Patent
Kyuto et al.

(10) Patent No.: US 11,117,445 B2
(45) Date of Patent: Sep. 14, 2021

(54) VEHICLE AIR CONDITIONING DEVICE

(71) Applicant: DENSO CORPORATION, Kariya (JP)

(72) Inventors: Tatsuro Kyuto, Kariya (JP); Hiroyuki Kobayashi, Kariya (JP); Yoshiharu Endo, Kariya (JP)

(73) Assignee: DENSO CORPORATION, Kariya (JP)

( * ) Notice: Subject to any disclaimer, the term of this patent is extended or adjusted under 35 U.S.C. 154(b) by 236 days.

(21) Appl. No.: 16/420,257

(22) Filed: May 23, 2019

(65) Prior Publication Data
US 2019/0275861 A1 Sep. 12, 2019

Related U.S. Application Data

(63) Continuation of application No. PCT/JP2017/038656, filed on Oct. 26, 2017.

(30) Foreign Application Priority Data

Nov. 25, 2016 (JP) .............................. JP2016-228999

(51) Int. Cl.
*B60H 1/00* (2006.01)
*B60H 3/02* (2006.01)
(Continued)

(52) U.S. Cl.
CPC ........... *B60H 1/00921* (2013.01); *B60H 1/22* (2013.01); *B60H 1/32* (2013.01); *B60H 3/024* (2013.01);
(Continued)

(58) Field of Classification Search
CPC . B60H 3/024; F25B 1/00; F25B 29/00; F25B 29/003; F25B 31/002; F25B 31/004; B25B 5/00
(Continued)

(56) References Cited

U.S. PATENT DOCUMENTS 6,314,750 B1  11/2001  Ishikawa et al.
8,991,199 B2 *  3/2015  Honda ..................... F25B 7/00
                                                    62/160
(Continued)

FOREIGN PATENT DOCUMENTS

JP    2001027455 A    1/2001
JP    2004176938 A    6/2004
(Continued)

Primary Examiner — Joel M Attey
(74) Attorney, Agent, or Firm — Harness, Dickey & Pierce, P.L.C.

(57) ABSTRACT

A vehicle air conditioning device includes a compressor, a radiator, an outside heat exchanger, an evaporator, a first decompressor, a second decompressor, a switching portion, and a controller. The radiator exchanges heat between a refrigerant discharged from the compressor and air. The outside heat exchanger exchanges heat between outside air and the refrigerant flowing out of the radiator. The evaporator is exchanges heat between the refrigerant flowing out of the outside heat exchanger and the air flowing through the radiator. The switching portion switches between a series dehumidifying-heating mode and a parallel dehumidifying-heating mode. The controller is configured to control the switching portion to switch from the parallel dehumidifying-heating mode to the series dehumidifying-heating mode when the amount of the refrigerant oil flowing from the outside heat exchanger to the compressor is insufficient in the parallel dehumidifying-heating mode.

4 Claims, 6 Drawing Sheets

(51) Int. Cl.
    *F25B 5/00*         (2006.01)
    *F25B 1/00*         (2006.01)
    *B60H 1/22*         (2006.01)
    *B60H 1/32*         (2006.01)
    *F25B 29/00*       (2006.01)
    *F25B 31/00*       (2006.01)

(52) U.S. Cl.
    CPC ................ *F25B 1/00* (2013.01); *F25B 5/00* (2013.01); *F25B 29/00* (2013.01); *F25B 31/002* (2013.01); *F25B 31/004* (2013.01); *F25B 29/003* (2013.01)

(58) Field of Classification Search
    USPC .......................................................... 62/222
    See application file for complete search history.

(56) References Cited

U.S. PATENT DOCUMENTS

| | | |
|---|---|---|
| 2009/0151378 A1 | 6/2009 | Kawakatsu et al. |
| 2012/0255319 A1 | 10/2012 | Itoh et al. |
| 2015/0159933 A1 | 6/2015 | Itoh et al. |

FOREIGN PATENT DOCUMENTS

| | | | |
|---|---|---|---|
| JP | 2005291552 A | 10/2005 | |
| JP | 2007071505 A | 3/2007 | |
| JP | 2012225637 A | 11/2012 | |
| JP | 2018075921 A | 5/2018 | |
| JP | 2018075922 A | 5/2018 | |
| JP | 2018077020 A | 5/2018 | |
| WO | WO-2018088033 A1 | 5/2018 | |
| WO | WO-2018088034 A1 | 5/2018 | |

\* cited by examiner

//10;//
VEHICLE AIR CONDITIONING DEVICE

CROSS REFERENCE TO RELATED APPLICATIONS

The present application is a continuation application of International Patent Application No. PCT/JP2017/038656 filed on Oct. 26, 2017, which designated the United States and claims the benefit of priority from Japanese Patent Application No. 2016-228999 filed on Nov. 25, 2016. The entire disclosures of all of the above applications are incorporated herein by reference.

TECHNICAL FIELD

The present disclosure relates to a vehicle air conditioning device performing a dehumidifying-heating mode.

BACKGROUND

A conventional refrigeration cycle device includes a compressor, an inside condenser, a first expansion valve, an outside heat exchanger, a second expansion valve, and an inside evaporator.

In the conventional refrigeration cycle device, a first dehumidifying-heating mode and a second dehumidifying-heating mode are switched appropriately based on an operation condition in a vehicle air conditioning device.

SUMMARY

A vehicle air conditioning device according to an aspect of the present disclosure includes a compressor, a radiator, an outside heat exchanger, an evaporator, a first decompressor, a second decompressor, a switching portion, and a controller. The compressor draws, compresses, and discharges a refrigerant containing a refrigerant oil. The radiator heats air by exchanging heat between the refrigerant discharged from the compressor and the air sent to a passenger compartment. The outside heat exchanger is configured to exchange heat between outside air and the refrigerant flowing out of the radiator. The evaporator evaporates the refrigerant by exchanging heat between the refrigerant flowing out of the outside heat exchanger and the air flowing through the radiator. The first decompressor decompresses the refrigerant flowing out of the radiator. The second decompressor decompresses the refrigerant flowing out of the outside heat exchanger. The switching portion switches between a series dehumidifying-heating mode in which the outside heat exchanger and the evaporator are connected in series with each other with respect to a flow of the refrigerant and a parallel dehumidifying-heating mode in which the outside heat exchanger and the evaporator are connected in parallel with each other with respect to the flow of the refrigerant. The controller is configured to control the switching portion to switch from the parallel dehumidifying-heating mode to the series dehumidifying-heating mode when the amount of the refrigerant oil flowing from the outside heat exchanger to the compressor is insufficient in the parallel dehumidifying-heating mode.

By switching from the parallel dehumidifying-heating mode to the series dehumidifying-heating mode, the amount of the refrigerant flowing through the outside heat exchanger increases, and accordingly the refrigerant oil in the outside heat exchanger is likely to return to the compressor. Accordingly, the refrigerant oil can be limited from remaining in the outside heat exchanger.

A vehicle air conditioning device according to another aspect of the present disclosure includes a compressor, a radiator, an outside heat exchanger, an evaporator, a first decompressor, a second decompressor, and a controller. The compressor draws, compresses, and discharges a refrigerant containing a refrigerant oil. The radiator heats air by exchanging heat between the refrigerant discharged from the compressor and the air sent to a passenger compartment. The outside heat exchanger is configured to exchange heat between outside air and the refrigerant flowing out of the radiator. The evaporator evaporates the refrigerant by exchanging heat between the refrigerant flowing out of the outside heat exchanger and the air flowing through the radiator. The first decompressor decompresses the refrigerant flowing out of the radiator. The second decompressor decompresses the refrigerant flowing out of the outside heat exchanger. The controller is configured to control an opening degree of the first decompressor. The outside heat exchanger and the evaporator are connected in parallel with each other with respect to the flow of the refrigerant. The controller increases the opening degree of the first decompressor when the amount of the refrigerant oil flowing from the outside heat exchanger to the compressor is insufficient.

According to this, since the flow rate of the refrigerant flowing through the outside heat exchanger is increased by increasing the opening degree of the first decompressor, the refrigerant oil can be likely to return from the outside heat exchanger to the compressor. Accordingly, the refrigerant oil can be limited from remaining in the outside heat exchanger.

EMBODIMENTS

Figure 1:
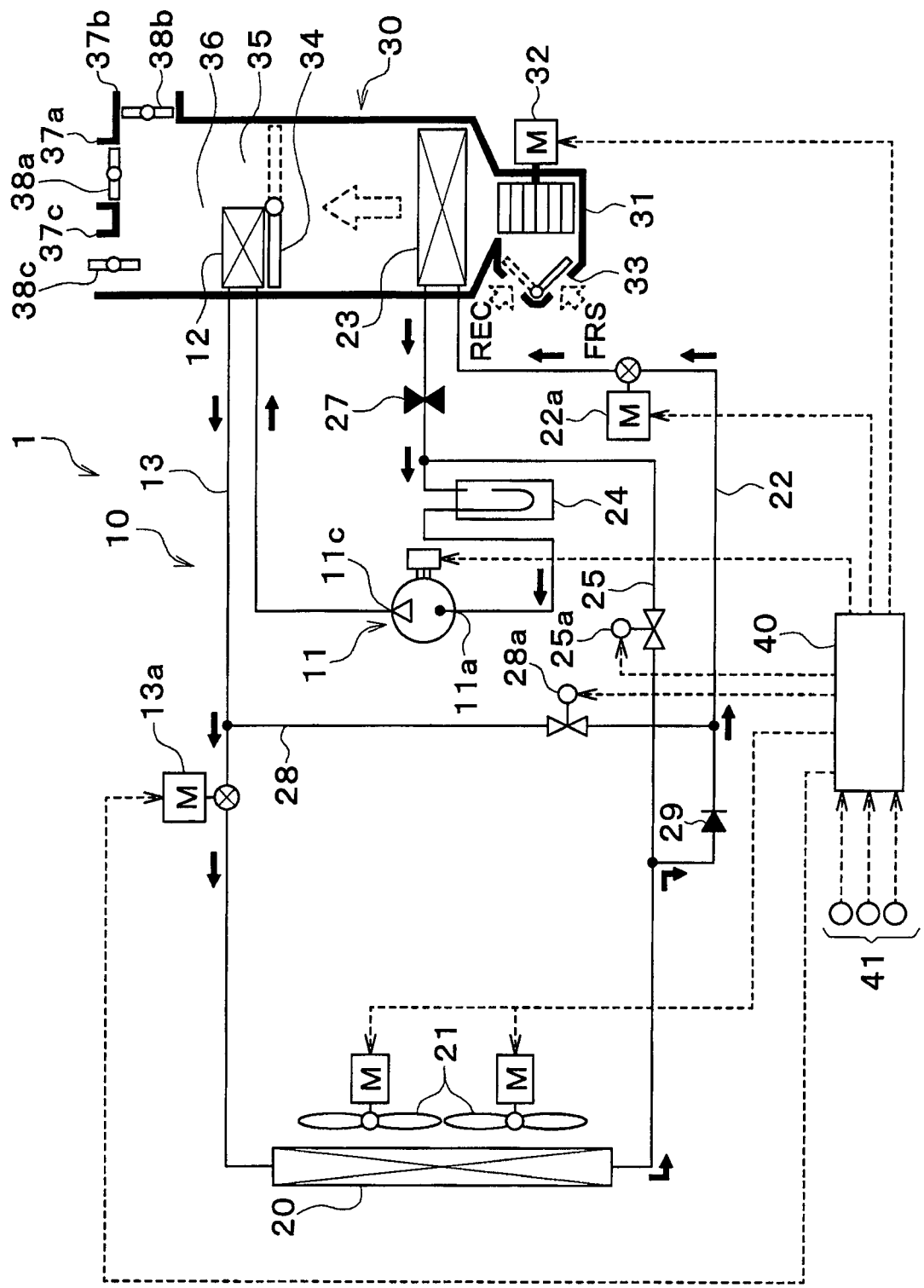
FIG. 1 is a diagram illustrating a refrigerant circuit in a cooling mode and a series dehumidifying-heating mode of a heat pump cycle according to an embodiment of the present disclosure.

A refrigeration cycle device of a comparative example includes a compressor, an inside condenser, a first expansion valve, an outside heat exchanger, a second expansion valve, and an inside evaporator.

In the refrigeration cycle device of the comparative example, a first dehumidifying-heating mode and a second dehumidifying-heating mode are switched appropriately based on an operation condition in a vehicle air conditioning device.

In the first dehumidifying-heating mode, the outside heat exchanger and the inside evaporator are connected in series with respect to a flow of a refrigerant. Specifically, in the first dehumidifying-heating mode, high-pressure refrigerant discharged by the compressor flows into the inside condenser, and the refrigerant flowing into the inside condenser releases heat by exchanging heat with air blown into a passenger compartment. Accordingly, the air sent to the vehicle compartment is heated.

The refrigerant flowing out of the inside condenser is decompressed and expanded by the first expansion valve to be low-pressure refrigerant. The low-pressure refrigerant decompressed and expanded by the first expansion valve flows into the outside heat exchanger, and then exchanges heat with outside air to absorb heat. The refrigerant flowing out of the outside heat exchanger flows into the inside evaporator and exchanges heat with the air blown into the passenger compartment, and thus the refrigerant absorbs heat. Accordingly, the air sent to the vehicle compartment is dehumidified. The air dehumidified by the inside evaporator flows into the inside condenser to be heated. Accordingly, the passenger compartment is dehumidified and heated. The refrigerant flowing out of the inside evaporator is drawn into the compressor and compressed again.

In contrast, in the second dehumidifying-heating mode, high-pressure refrigerant discharged by the compressor flows into the inside condenser, and the refrigerant flowing into the inside condenser releases heat by exchanging heat with air blown into a passenger compartment. Accordingly, the air sent to the vehicle compartment is heated.

The refrigerant flowing out of the inside condenser is separated into a refrigerant flow flowing into the first expansion valve and a refrigerant flow flowing into the second expansion valve. The refrigerant flowing into the first expansion valve is decompressed and expanded until it becomes low-pressure refrigerant. The low-pressure refrigerant decompressed and expanded by the first expansion valve flows into the outside heat exchanger, and then exchanges heat with outside air to absorb heat.

The refrigerant flowing into the second expansion valve is decompressed and expanded until it becomes low-pressure refrigerant. The refrigerant decompressed and expanded by the second expansion valve flows into the inside evaporator and exchanges heat with the air blown into the passenger compartment, and thus the refrigerant absorbs heat. Accordingly, the air sent to the vehicle compartment is dehumidified. The air dehumidified by the inside evaporator flows into the inside condenser to be heated. Accordingly, the passenger compartment is dehumidified and heated. The refrigerant flowing out of the outside heat exchanger and the refrigerant flowing out of the inside evaporator is drawn into the compressor and compressed again.

In the second dehumidifying-heating mode, differently in the first dehumidifying-heating mode, the outside heat exchanger and the inside evaporator are connected in parallel with respect to the flow of the refrigerant, the saturation temperature (i.e. evaporation temperature) of the refrigerant in the outside heat exchanger is lower than the saturation temperature (i.e. evaporation temperature) of the refrigerant in the inside evaporator. Accordingly, in the second dehumidifying-heating mode, a heating capacity of the air can be higher than the first dehumidifying-heating mode.

The refrigerant is mixed with refrigerant oil serving as a lubricant oil of a compressor, and the refrigerant oil partially circulates in the cycle together with the refrigerant.

In the comparative example, in the second dehumidifying-heating mode, the outside heat exchanger and the inside evaporator are connected in parallel with each other with respect to the flow of the refrigerant. In the second dehumidifying-heating mode, an opening degree of the first expansion valve is occasionally throttled as much as possible to decrease the temperature of the inside evaporator to a target temperature.

According to studies by the inventors of the present disclosure, in the second dehumidifying-heating mode, the flow rate of the refrigerant flowing through the outside heat exchanger decreases. Accordingly, refrigerant oil may remain in the outside heat exchanger without flowing out of the outside heat exchanger, and the lubricity in the compressor may be deteriorated.

Hereinafter, embodiments will be described with reference to the drawings. In the present embodiment, a heat pump cycle 10 is used in a vehicle air conditioning device 1 of a hybrid vehicle that obtains a driving force for traveling from an engine (i.e. an internal combustion engine) and a travelling electric motor. The heat pump cycle 10 is a vapor compression type refrigeration cycle.

The heat pump cycle 10 performs a function of cooling or heating air sent to a passenger compartment in the vehicle air conditioning device 1. Accordingly, an air-conditioning target space of the present embodiment is a space in the passenger compartment, and a target heat exchanging fluid of the present embodiment is the air sent into the passenger compartment.

Figure 2:
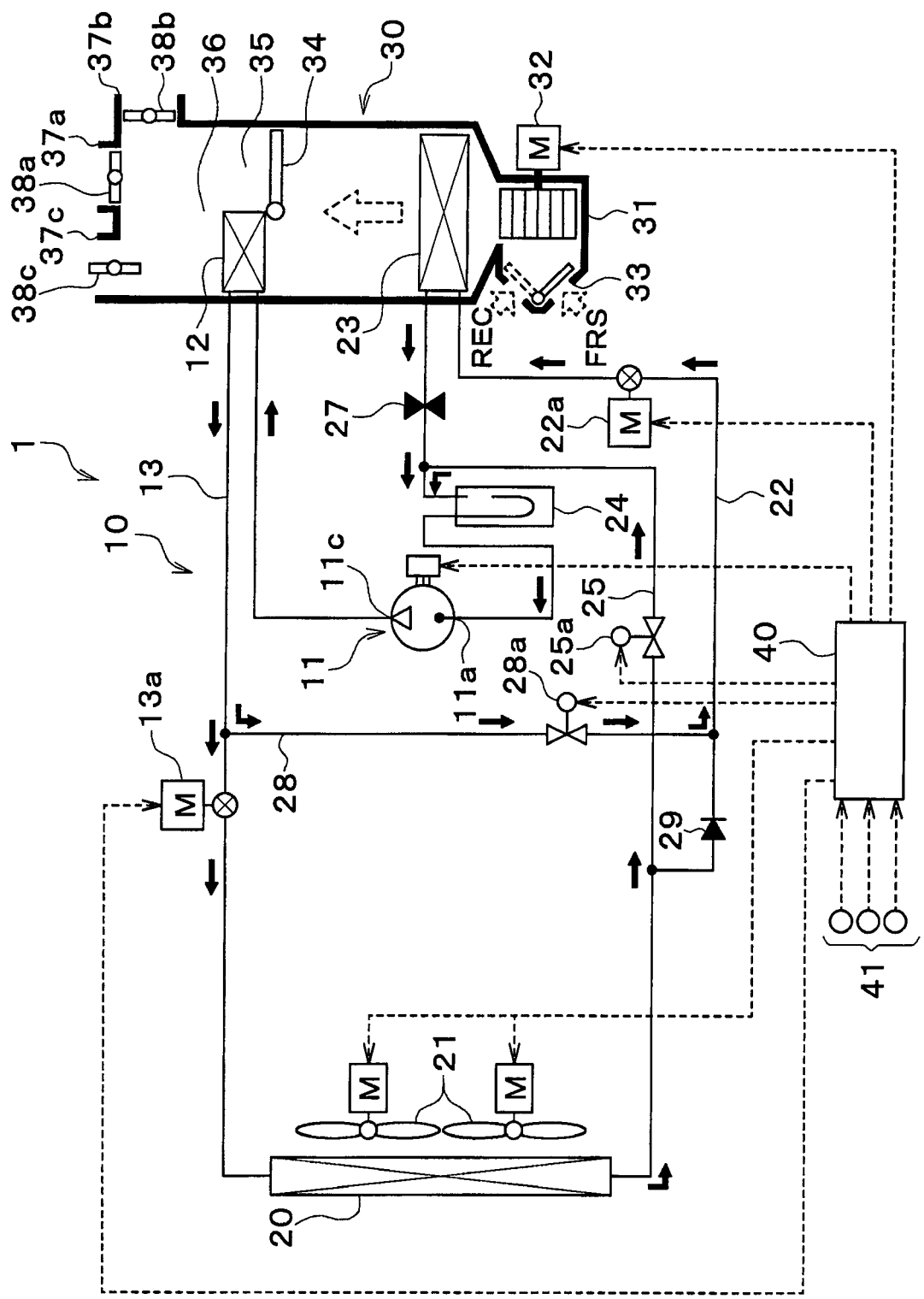
FIG. 2 is a diagram illustrating a refrigerant circuit in a parallel dehumidifying-heating mode of the heat pump cycle according to the embodiment.
Figure 3:
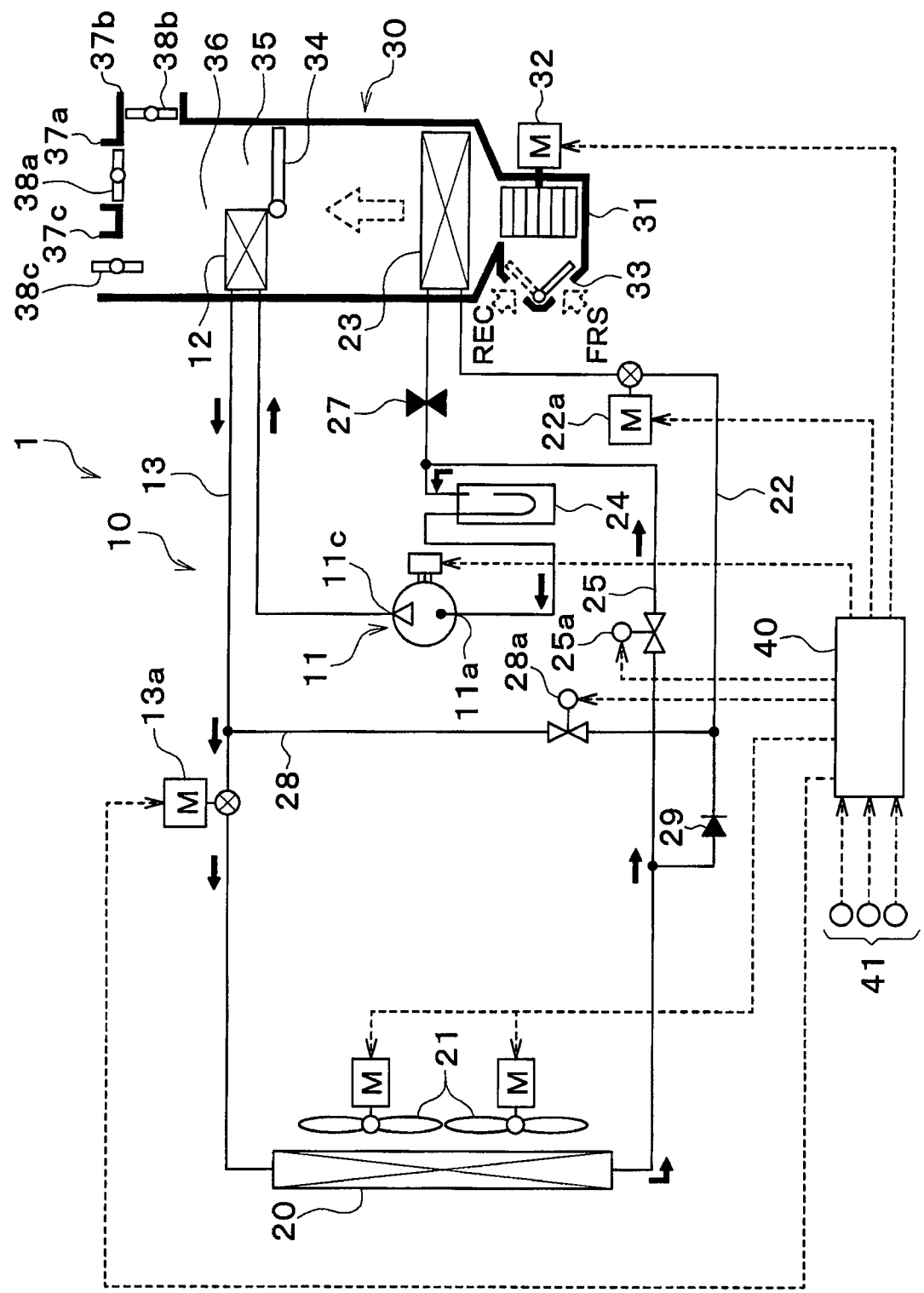
FIG. 3 is a diagram illustrating a refrigerant circuit in a heating mode of the heat pump cycle according to the embodiment.

The heat pump cycle 10 is configured to be switchable between a cooling circuit of a cooling mode shown in FIG. 1, a cooling circuit of a series dehumidifying-heating mode shown in FIG. 1, a cooling circuit of a parallel dehumidifying-heating mode shown in FIG. 2, and a cooling circuit of a heating mode shown in FIG. 3. In FIGS. 1-3, a flow of the refrigerant in each of the operation modes is indicated with solid arrows.

The cooling mode is a cooling operation mode for cooling the air sent into the passenger compartment to cool the passenger compartment. The series dehumidifying-heating mode and the parallel dehumidifying-heating mode are dehumidifying-heating operation modes for heating the air sent into the passenger compartment after dehumidifying the air to dehumidify and heat the passenger compartment. The heating mode is a heating operation mode for heating the air sent into the passenger compartment to heat the passenger compartment.

The heat pump cycle 10 employs an HFC refrigerant (specifically, R134a) as a refrigerant and constitutes a vapor compression subcritical refrigeration cycle in which the high-pressure side refrigerant pressure does not exceed the critical pressure of the refrigerant. It is needless to say that an HFO based refrigerant (for example, R1234yf) or the like may be employed as the refrigerant. The refrigerant is mixed with refrigerant oil serving as a lubricant oil of a compressor 11, and the refrigerant oil partially circulates in the cycle together with the refrigerant.

The compressor 11 of the heat pump cycle 10 draws, compresses, and discharges the refrigerant. The compressor 11 is disposed in the engine compartment of the vehicle. The compressor 11 is an electric compressor that accommodates a compression mechanism and an electric motor inside a housing defining its outer body.

The housing of the compressor 11 has an intake port 11*a* through which the low-pressure refrigerant is drawn into the compression mechanism from an outside of the housing, and a discharge port 11*c* through which the high-pressure refrigerant discharged from the compression mechanism to the outside of the housing. A scroll type compression mechanism, a bane type compression mechanism, or a rolling piston type compression mechanism may be used as the compression mechanism, for example.

A rotational speed of the electric motor of the compressor 11 is controlled by control signals output from a controller 40. Any of an AC motor and a DC motor may be employed as the electric motor. By controlling the rotational speed of the electric motor, the refrigerant discharge capacity of the compressor 11 is varied. Accordingly, the electric motor is a discharge capacity changing portion of the compressor 11.

A refrigerant inlet side of the interior condenser 12 is connected to the discharge port 11c of the compressor 11. The inside condenser 12 is located in an air-conditioning case 31 of an inside air-conditioning unit 30 of the vehicle air conditioning device 1, and functions as a radiator (i.e. high-pressure side heat exchanger) that dissipates heat of the high-temperature and high-pressure refrigerant discharged from a high-stage side compression mechanism of the compressor 11. The inside condenser 12 is an air heating heat exchanger that heats the air passing through the inside evaporator 23.

A high-pressure refrigerant passage 13 is connected to an outlet side of the inside condenser 12. The high-pressure refrigerant passage 13 is a refrigerant passage guiding the refrigerant flowing out of the inside condenser 12 to the outside heat exchanger 20. A high-stage side expansion valve 13a is located in the high-pressure refrigerant passage 13. The high-stage side expansion valve 13a is a high-stage side decompressor that decompresses the high-pressure refrigerant flowing out of the inside condenser 12 until the high-pressure refrigerant becomes an intermediate-pressure refrigerant. The high-stage side evaporator 13a is a first decompressor.

The high-stage side expansion valve 13a is an electric variable throttle mechanism including a valve body of which a throttle opening is changeable and an electric actuator formed of a stepping motor that changes the throttle opening degree of the valve body.

The high-stage side expansion valve 13a can be fully opened not to exert a refrigerant decompression function. An operation of the high-stage side expansion valve 13a is controlled by a control signal output from a controller 40.

An outlet side of the high-stage side expansion valve 13a is connected to a refrigerant inlet side of the outside heat exchanger 20. The outside heat exchanger 20 is located inside the hood of the vehicle and exchanges heat between the refrigerant flowing therein and the outside air blown from a blowing fan 21. The exterior heat exchanger 20 is a heat exchanger that functions as an evaporator configured to exert a heat absorbing action by evaporating the low-pressure refrigerant at least during the heating mode and functions as a radiator configured to radiate a heat of the high-pressure refrigerant during the cooling mode, for example.

A cooling refrigerant passage 22 is connected to the refrigerant outlet side of the outside heat exchanger 20. The cooling refrigerant passage 22 is a refrigerant passage that guides the refrigerant flowing out of the outside heat exchanger 20 to a suction side of the compressor 11 through an accumulator 24.

A cooling expansion valve 22a is located in the cooling refrigerant passage 22. The cooling expansion valve 22a decompresses the refrigerant flowing out of the outside heat exchanger 20 and into the inside evaporator 23 during the cooling operation mode, for example. The configuration of the cooling expansion valve 22a is basically the same as the high-stage side expansion valve 13a, and the operation of the cooling expansion valve 22a is controlled by control signals output from the controller 40. The cooling evaporator 22a is a second decompressor.

An outlet side of the cooling expansion valve 22a is connected to a refrigerant inlet side of the inside evaporator 23. The inside evaporator 23 is located upstream of the inside condenser 12 with respect to the flow of the air in the air-conditioning case 31 of the inside air-conditioning unit 30. The inside evaporator 23 is a heat exchanger that functions as an evaporator (i.e. an air cooling heat exchanger) that cools the air sent to the passenger compartment by evaporating the refrigerant flowing therein to exert a heat absorbing function during the cooling operation mode and the dehumidifying-heating operation mode.

The inlet side of the accumulator 24 is connected to an outlet side of the interior evaporator 23. The accumulator 24 is a low pressure side gas-liquid separator that achieves separation between gas and liquid in the refrigerant flowing into the accumulator 24 to accumulate surplus refrigerant. The gas-phase refrigerant outlet of the accumulator 24 is connected to the intake port 11a of the compressor 11. Accordingly, the inside evaporator 23 is connected to the suction port 11a of the compressor 11 to send the refrigerant.

A low-pressure side bypass passage 25 is connected to the refrigerant outlet side of the outside heat exchanger 20. The low-pressure bypass passage 25 is a refrigerant passage through which the refrigerant flowing out of the outside heat exchanger 20 bypasses the cooling expansion valve 22a and the inside evaporator 23 and is guided toward the inlet side of the accumulator 24. A low-pressure side on-off valve 25a is located in the low-pressure bypass passage 25.

The low-pressure side on-off vale 25a is an electromagnetic valve that opens and closes the low-pressure side bypass passage 25, and the open and the close of the low-pressure side on-off valve 25a is controlled by control voltages output from the controller 40.

A pressure loss occurring when the refrigerant passes through the low-pressure side on-off valve 25c is extremely small as compared with a pressure loss occurring when the refrigerant passes through the cooling expansion valve 22a. Therefore, the refrigerant that has flowed out of the outside heat exchanger 20 flows into the accumulator 24 through the low-pressure side bypass passage 25 when the low-pressure side on-off valve 25a is open. At this time, the cooling expansion valve 22a may be fully closed.

The refrigerant flowing out of the outside heat exchanger 20 flows into the inside evaporator 23 through the cooling expansion valve 22a when the low-pressure side on-off valve 25a is closed. According to this, the low-pressure side on-off valve 25a is configured to switch the refrigerant passage of the heat pump cycle 10. Accordingly, the low-pressure side on-off valve 25a is a refrigerant passage switching portion that switches the refrigerant passage of the refrigerant circulating in the cycle. The refrigerant passage switching portion may be a switching portion.

A constant pressure valve 27 is located between the outlet side of the inside evaporator 23 and the inlet side of the accumulator 24. The constant valve 27 is a constant pressure regulator that maintains the pressure of the refrigerant on outlet side of the inside evaporator 23 to be a predetermined pressure.

The high-pressure side bypass passage 28 is a refrigerant passage through which the refrigerant flowing out of the inside condenser 12 bypasses the outside heat exchanger 20 and is guided to the inlet side of the cooling expansion valve 22a.

A high-pressure side on-off valve 28a is located in the high-pressure bypass passage 28. The high-pressure side on-off valve 28a is an electromagnetic valve that opens and closes the high-pressure side bypass passage 28. An operation of the high-pressure side on-off valve 28a is controlled by a control signal output from a controller 40.

The high-pressure side on-off valve 28a opens and closes the high-pressure side bypass passage 28 to switch a cycle configuration (i.e. refrigerant passage). Accordingly, the high-pressure side on-off valve 28a is a refrigerant passage switching portion that switches the refrigerant passage of the refrigerant circulating in the cycle. The refrigerant passage switching portion may be a switching portion.

A check valve 29 is located on the outlet side of the outside heat exchanger 20. The check valve 29 is a backflow prevention portion that allows the refrigerant to flow from the outlet side of the outside heat exchanger 20 to the inlet side of the cooling expansion valve 22a, and prevents the refrigerant from flowing from the inlet side of the cooling expansion valve 22a to the outlet side of the outside heat exchanger 20. The check valve 29 prevents the refrigerant flowing through the high-pressure side bypass passage 28 from flowing backward to the outside heat exchanger 20.

Next, the inside air-conditioning unit 30 will be described. The interior air-conditioning unit is disposed on an inner side of an instrument panel positioned front-most in the passenger cabin. The inside air-conditioning unit 30 includes the air-conditioning case 31. The air-conditioning case 31 defines an outer body of the inside air-conditioning unit 30. An air passage for the air sent to the passenger compartment is defined in the air-conditioning case 31. The air passage in the air-conditioning case 31 accommodates a blower 32, the interior condenser 12, the interior evaporator 23, and the like.

An inside-outside air switching device 33 that switches the introduced air between the inside air and the outside air is located on the most upstream part of the air-conditioning case 31. The inside-outside switching device 33 has an inside air introduction port through which the inside air flows into the air-conditioning case 31 and an outside air introduction port through which the outside air flows into the air-conditioning case 31. The inside-outside air switch device 33 is an inside outside air ratio regulator that continuously adjusts an opening area of the inside air introduction port and an opening area of the outside air introduction port by the inside-outside air switch door, and continuously changes an air volume ratio of an inside air volume and an outside air volume.

The blower 32 that supplies air sucked via the inside/outside air switching device 33 toward the vehicle interior is disposed on the air flow downstream side of the inside/outside air switching device 33. The blower 32 is an electric blower that drives a centrifugal multi-blade fan by using an electric motor. The rotation speed (i.e. air supply amount) of the blower 32 is controlled by a control voltage output from the controller 40.

The interior evaporator 23 and the interior condenser 12 are disposed on the air flow downstream side of the blower 32 in the stated order of the interior evaporator 23 and the interior condenser 12 along the flow of the air sent into the passenger compartment. In other words, the interior evaporator 23 is disposed on the air flow upstream side of the interior condenser 12 along the air flow.

A heater core that is not shown is located between the inside evaporator 23 and the inside condenser 12. The heater core is an auxiliary heating heat exchanger that supplementarily heats the air by exchanging heat between the engine cooling water and the air having passed through the inside evaporator 23.

A bypass passage 35 through which the air having passed through the inside evaporator 23 bypasses the heater core and the inside condenser 12 is located in the air-conditioning case 31, and an air mix door 34 is located downstream of the inside evaporator 23 and upstream of the heater core and the inside condenser 12.

The air mix door 34 is a flow rate regulator that adjusts the flow rate (i.e. volume of the air) of the air flowing into the inside condenser 12 by adjusting the ratio of the air flowing through the heater core and the inside condenser 12 and the air flowing through the bypass passage 35. The air mix door 34 adjusts the heat exchange capacity of the inside condenser 12.

A merging space 36 in which the air heated by heat exchange with the refrigerant in the interior condenser 12 and the air not heated by passing through the bypass passage 35 are merged with each other is provided on the air flow downstream side of the interior condenser 12 and the bypass passage 35.

Openings for blowing out the air merged in the merging space 36 into the passenger compartment as the cooling target space are provided in the most downstream portion of the air-conditioning case 31. Specifically, the openings include a defroster opening 37a for blowing an air conditioning wind toward an inside surface of a vehicle front window glass, a face opening 37b for blowing the conditioned air toward an upper half of an occupant in the vehicle compartment, and a foot opening 37c for blowing the conditioned air toward an occupant's feet.

The air mixing door 34 adjusts the air volume ratio between the air volume allowed to pass through the interior condenser 12 and the air volume allowed to pass through the bypass passage 35, to thereby adjust a temperature of the air in the merging space 36. The air mixing door 34 is driven by a not-shown servomotor whose operation is controlled by a control signal output from the controller 40.

A defroster door 38a that adjusts the opening area of the defroster opening 37a, a face door 38b that adjusts the opening area of the defroster opening 37a, a foot door 38c that adjusts the opening area of the foot opening 37c are located upstream of the defroster opening 37a, the face opening 37b, and the foot opening 37c, respectively.

These defroster door 38a, face door 38b, and foot door 38c open the openings 37a-37c respectively and constitute an air blowout opening mode switching means for switching an air blowout mode. An operation of the blowout opening mode switching means is driven by a not-shown servo motor whose operation is controlled by a control signal output from the controller 40 via a link mechanism or the like.

The air flow downstream sides of the defroster opening 37a, the face opening 37b, and the foot opening 37c are connected to a face blowing port, a foot blowing port, and a defroster blowing port provided in the vehicle compartment through ducts forming air passages, respectively.

The blowing port mode includes a face mode in which the face opening 37b is fully opened to blow out the air through the face opening toward the upper body of the occupant, a bi-level mode in which the face opening 37b and the foot opening 37c are opened to blow out the air toward upper body and feet of the occupant, and a foot mode in which the foot opening 37c is fully opened and the defroster opening 37a is slightly opened to blow out the air mainly through the foot opening, for example.

An electric control unit of the present embodiment will be hereinafter described. The controller 5 includes a known microcomputer including CPU, ROM, RAM and the like, and peripheral circuits. The control device performs various calculations and processes based on an air-conditioning control program stored in the ROM. The controller 40 controls operations of various air-conditioning control devices such as the compressor 11, the high-stage side expansion valve 13a, the blowing fan 21, the cooling expansion valve 22a, the low-pressure side on-off valve 25a, the high-pressure side on-off valve 28a, and the blower 32.

Sensors 41 for the air conditioning are connected to an input side of the controller 40. The sensors 41 includes an inside air sensor, an outside air sensor, a solar irradiance sensor, an evaporator temperature sensor, a discharge pressure sensor, a condenser temperature sensor, and a suction pressure sensor, for example.

The inside air sensor detects the vehicle interior temperature. The outside air sensor detects the outside air temperature. The insolation sensor detects the amount of insolation in the vehicle compartment. The evaporator temperature sensor detects the temperature of the air blown out of the inside evaporator 23 (i.e. evaporator temperature). The discharge pressure sensor detects the pressure of the high-pressure refrigerant discharged from the compressor 11. The condenser temperature sensor detects the temperature of the refrigerant flowing out of the inside condenser 12. The suction pressure sensor detects the pressure of the refrigerant drawn into the compressor 11.

The controller 40 has an input end connected with an operation panel (not shown) and receives operation signals from various air-conditioning operation switches provided with the operation panel. The operation panel is located in the vicinity of the instrument panel in the front part of the passenger compartment. The various air-conditioning operation switches on the operation panel includes an operation switch of the vehicle air conditioning device 1, a passenger compartment temperature setting switch for setting the temperature of the passenger compartment, a mode setting switch for selectively setting the cooling operation mode, the dehumidifying-heating operation mode and the heating operation mode.

The controller 40 is integrated with control units for controlling the operation of various air-conditioning control devices that is connected to the output side of the controller 40. In the controller 40, configurations (specifically, hardware and software) that control the operation of each of the control target devices constitute a control unit that controls the operation of each of the control target devices.

For example, a part (specifically, hardware and software) of the controller 40 that controls the operation of the electric motor of the compressor 11 constitutes a discharge capacity controller. For example, a part (specifically, hardware and software) of the controller 40 that controls the operations of the low-pressure side on-off valve 25a and the high-pressure side on-off valve 28a constitutes a refrigerant circuit controller. It is needless to say that the discharge capacity control unit and the refrigerant circuit controller may be configured as separate control devices for the controller 40.

Next, the operation of the vehicle air conditioner 1 according to the present embodiment in the above configuration will be described. The vehicle air conditioning device 1 of the present embodiment is configured to switch between the cooling mode for cooling the passenger compartment, the series dehumidifying-heating mode and parallel dehumidifying-heating mode for dehumidifying and heating the passenger compartment, and the heating mode for heating the passenger compartment.

Switching between these operation modes is performed by executing the air-conditioning control program. The air-conditioning control program is executed when the auto switch of the operation panel is turned on.

In the main routine of the air-conditioning control program, the detection signal of the sensor group for air-conditioning control and the operation signal from various air-conditioning operation switches are read. Then, based on the value of the detection signal and the value of the operation signal, a target blown air temperature TAO which is a target temperature of the air blown into the vehicle compartment is calculated based on the following formula F1.

$$TAO = Kset \times Tset - Kr \times Tr - Kam \times Tam - Ks \times As + C \quad (F1)$$

Tset is the set temperature in the passenger compartment set with the temperature setting switch, Tr is the passenger compartment temperature (i.e. inside air temperature) detected by the inside air sensor, Tam is the outside air temperature detected by the outside air sensor, and As is the amount of solar irradiance detected by the solar radiation sensor. The formula also includes Kset, Kr, Kam, and Ks indicating control gains, and C indicating a correction constant.

When the cooling switch of the operation panel is turned on and the target blowing temperature TAO is lower than a predetermined cooling reference temperature $\alpha$, the cooling mode is performed. The series dehumidifying-heating mode is performed when the following conditions are satisfied: the cooling switch on the operation panel is turned on; the target flow-out temperature TAO is at or above the cooling reference temperature $\alpha$; and the outside air temperature Tam is higher than a predetermined dehumidifying-heating reference temperature $\beta$.

The parallel dehumidifying-heating mode is performed when the following conditions are satisfied: the cooling switch on the operation panel is turned on; the target flow-out temperature TAO is at or above the cooling reference temperature $\alpha$; and the outside air temperature Tam is at or below the dehumidifying-heating reference temperature $\beta$. When the cooling switch is not turned on, the heating mode is performed.

According to this air-conditioning control program, the cooling mode is performed when the outside air temperature is relatively high mainly in summer. The series dehumidifying-heating mode is performed mainly in spring and autumn. The parallel dehumidifying-heating mode is performed mainly in early spring and late autumn when higher heating capacity than the series dehumidifying-heating mode is required for heating the air. The heating mode is performed mainly in winter when the outside air temperature is low.

(a) Cooling Mode

In the cooling mode, the controller 40 controls: the high-stage side expansion valve 13a to be fully open; the cooling expansion valve 22a to be in a throttle state where the cooling expansion valve 22a exerts a decompression function; the low-pressure side on-off valve 25a to be closed; and the high-pressure side on-off valve 28a to be closed.

According to this, in the cooling mode, the vapor compression type refrigeration cycle is formed, in which the refrigerant flows through, in order, the compressor 11, the outside heat exchanger 20, the cooling expansion valve 22a, the inside evaporator 23, the constant pressure valve 27, the accumulator 24, and the compressor 11 as shown in FIG. 1.

The controller 40 controls the operation of the compressor 11 such that the temperature of the air blown out of the inside evaporator 23 is at the target evaporator temperature TEO.

The target evaporator temperature TEO is determined to decrease with the decrease of the target flow-out temperature TAO. The target evaporator temperature TEO is determined within a range in which frost formation on the inside evaporator 23 can be limited.

The controller 40 controls the operation of the cooling expansion valve 22a such that the COP of the cycle approaches its local maximum value based on the pressure of the refrigerant flowing into the cooling expansion valve 22a. The controller 40 moves the air mix door 34 so as to fully close the air passage on the inside condenser 12 side.

In the refrigeration cycle device in the cooling mode, the outside heat exchanger 20 functions as a radiator, and the inside evaporator 23 functions as an evaporator. The heat of the refrigerant absorbed when the refrigerant evaporates in the inside evaporator 23 is released to the outside air in the outside heat exchanger 20. Thereby, the air can be cooled.

Accordingly, in the cooling mode, the cooling of the passenger compartment can be performed by blowing the air cooled by the inside evaporator 23 into the passenger compartment.

(b) Series Dehumidifying-Heating Mode

In the series dehumidifying-heating mode, the controller 40 controls: the high-stage side expansion valve 13a to be in a throttle state where the high-stage side expansion valve 22a exerts a decompression function; the cooling expansion valve 22a to be in a throttle state where the cooling expansion valve 22a exerts a decompression function; the low-pressure side on-off valve 25a to be closed; and the high-pressure side on-off valve 28a to be closed.

According to this, in the series dehumidifying-heating mode, the vapor compression type refrigeration cycle is formed, in which the refrigerant flows through, in order, the compressor 11, the inside condenser 12, the high-stage side expansion valve 13a, the outside heat exchanger 20, the cooling expansion valve 22a, the inside evaporator 23, the constant pressure valve 27, the accumulator 24, and the compressor 11 as shown in FIG. 1. That is, the refrigeration cycle is formed, in which the outside heat exchanger 20 and the inside evaporator 23 are connected in series with each other with respect to the flow of the refrigerant.

In this cycle, the controller 40 controls the operation of the compressor as in the cooling mode. The controller 40 controls the operation of the high-stage side expansion valve 13a and the cooling expansion valve 22a such that the temperature of the air blown out of the inside condenser 12 is at a target condenser temperature TAVO. The target condenser temperature TAVO is determined to increase with the increase of the target flow-out temperature TAO.

At this time, the controller 40 decreases the throttle degree of the high-stage side expansion valve 13a and increases the throttle degree of the cooling expansion valve 22a with the increase of the target condenser temperature TAVO. The controller 40 moves the air mix door 34 so as to fully open the air passage on the inside condenser 12 side.

Figure 4:
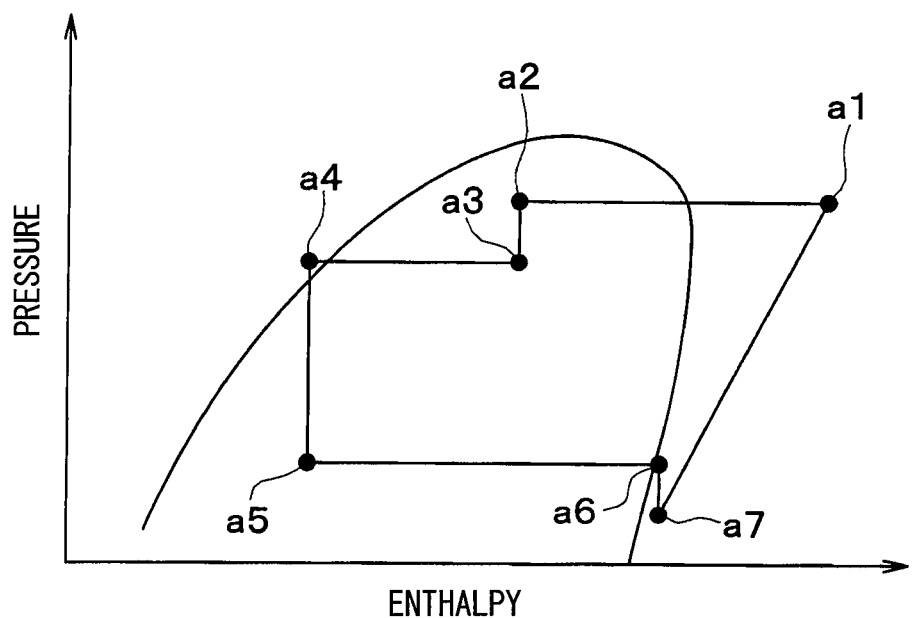
FIG. 4 is a Mollier diagram illustrating a state of a refrigerant in the series dehumidifying-heating mode of the heat pump cycle according to the embodiment.

Accordingly, in the series dehumidifying-heating mode, the state of the refrigerant circulating the cycle changes as shown in the Mollier diagram of FIG. 4.

That is, the high-pressure refrigerant discharged from the compressor 11 (point a1 of FIG. 4) flows into the inside condenser 12 to release heat by exchanging heat with the air cooled and dehumidified by the inside evaporator 23 (point a1 to point a2 of FIG. 4). Accordingly, the air sent to the vehicle compartment is heated.

The refrigerant flowing out of the inside condenser 12 flows into the high-stage side expansion valve 13a, and is decompressed to be the intermediate pressure refrigerant (point a2 to point a3 of FIG. 4). The intermediate pressure refrigerant decompressed by the high-stage side expansion valve 13a flows into the outside heat exchanger 20 and releases heat to the outside air (point a3 to point a4 of FIG. 4).

The refrigerant flowing out of the outside heat exchanger 20 flows into the cooling expansion valve 22a, and is decompressed and expanded by the cooling expansion valve 22a to be the low-pressure refrigerant (point a4 to point a5 of FIG. 4). The low-pressure refrigerant decompressed by the cooling expansion valve 22a flows into the inside evaporator 23, and evaporates by absorbing heat from the air (point a5 to point a6 of FIG. 4). Accordingly, the air sent to the passenger compartment is cooled. The refrigerant flowing out of the inside evaporator 23 flows through, in order, the constant pressure valve 27, the accumulator 24, and the suction side of the compressor 11, and then flows into the compressor 11 to be compressed again (point a6 to point a1 through point a7 of FIG. 4).

In the series dehumidifying-heating mode, the inside condenser 12 functions as a radiator, and the inside evaporator 23 functions as an evaporator. When the saturation temperature of the refrigerant in the outside heat exchanger 20 is higher than the temperature of the outside air, the outside heat exchanger 20 functions as a radiator. When the saturation temperature of the refrigerant in the outside heat exchanger 20 is lower than the outside air, the outside heat exchanger 20 functions as an evaporator.

Accordingly, when the saturation temperature of the refrigerant in the outside heat exchanger 20 is higher than the saturation temperature of the outside air, the radiation amount of the refrigerant in the outside heat exchanger 20 can be decreased by decreasing the saturation temperature of the refrigerant in the outside heat exchanger 20 with the increase of the target condenser temperature TAVO. According to this, the radiation amount of the refrigerant in the inside condenser 12 is increased to increase the heating capacity.

Accordingly, when the saturation temperature of the refrigerant in the outside heat exchanger 20 is lower than the temperature of the outside air, the heat absorption amount of the refrigerant in the outside heat exchanger 20 can be increased by decreasing the saturation temperature of the refrigerant in the outside heat exchanger 20 with the increase of the target condenser temperature TAVO. According to this, the radiation amount of the refrigerant in the inside condenser 12 is increased to increase the heating capacity.

Accordingly, in the series dehumidifying-heating mode, dehumidification and heating can be performed by blowing the air cooled and dehumidified by the inside evaporator 23 before reheating the air by the inside condenser 12. Further, the air heating capacity of the inside condenser 12 can be adjusted by adjusting the throttle degree of the high-stage side expansion valve 13a and the cooling expansion valve 22a.

(c) Parallel Dehumidifying-Heating Mode

In the parallel dehumidifying-heating mode, the controller 40 controls: the high-stage side expansion valve 13a to be in a throttle state where the high-stage side expansion valve 22a exerts a decompression function; the cooling expansion valve 22a to be in a throttle state where the cooling expansion valve 22a exerts a decompression function; the low-pressure side on-off valve 25a to be fully open; and the high-pressure side on-off valve 28a to be fully open.

According to this, in the parallel dehumidifying-heating mode, the vapor compression type refrigeration cycle is formed, in which the refrigerant flows through, in order, the compressor 11, inside condenser 12, the high-stage side expansion valve 13a, the outside heat exchanger 20, the accumulator 24, and the compressor 11. Further, in the refrigeration cycle, the refrigerant flows through, in order, the compressor 11, the inside condenser 12, the cooling expansion valve 22a, the inside evaporator 23, the constant pressure valve 27, the accumulator 24, and the compressor 11 as shown in FIG. 2. That is, the refrigeration cycle is formed, in which the outside heat exchanger 20 and the inside evaporator 23 are connected in parallel with each other with respect to the flow of the refrigerant.

The controller 40 controls the operation of the compressor 11 such that the temperature of the air blown out of the inside condenser 12 is the target condenser temperature TAVO. The controller 40 controls the operation of the cooling expansion valve 22a and the high-stage side expansion valve 13a such that the COP of the cycle approaches its local maximum value based on the pressure of the refrigerant flowing into the high-stage side expansion valve 13a. At this time, the controller 40 decreases the throttle degree of the high-stage side expansion valve 13a and increases the throttle degree of the cooling expansion valve 22a with the increase of the target condenser temperature TAVO. The controller 40 moves the air mix door 34 so as to fully open the air passage on the inside condenser 12 side.

Figure 5:
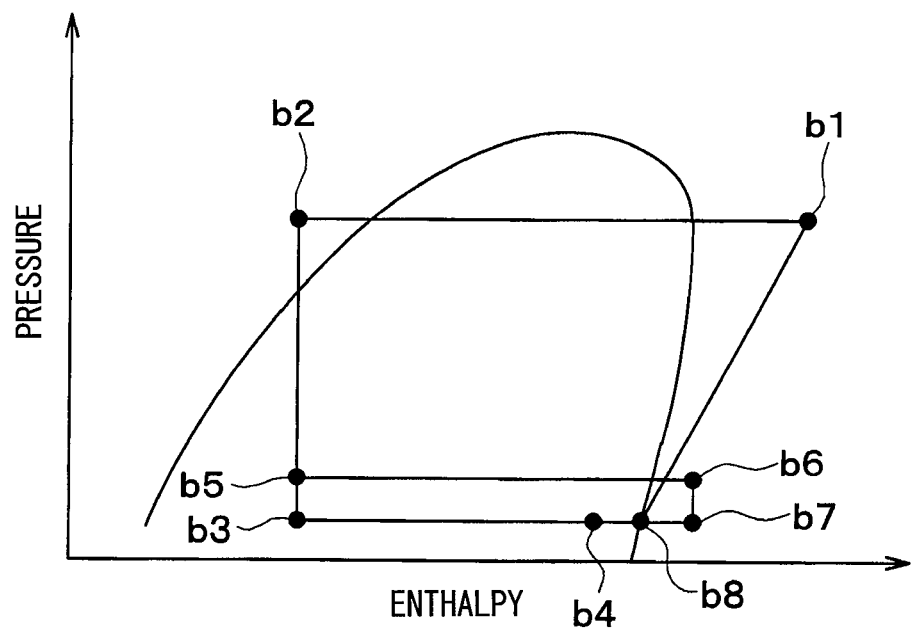
FIG. 5 is a Mollier diagram illustrating a state of a refrigerant in the parallel dehumidifying-heating mode of the heat pump cycle according to the embodiment.

Accordingly, in the parallel dehumidifying-heating mode, the state of the refrigerant circulating the cycle changes as shown in the Mollier diagram of FIG. 5.

That is, the high-pressure refrigerant discharged from the compressor 11 (point b1 of FIG. 5) flows into the inside condenser 12 to release heat by exchanging heat with the air cooled and dehumidified by the inside evaporator 23 (point b1 to point b2 of FIG. 5). Accordingly, the air sent to the vehicle compartment is heated. The flow of the refrigerant flowing out of the inside condenser 12 is branched into the flow flowing into the high-stage side expansion valve 13a and the flow flowing into the cooling expansion valve 22a.

The refrigerant flowing into the high-stage side expansion valve 13a is decompressed to be the low-pressure refrigerant and then flows into the outside heat exchanger 20 (point b2 to point b3 of FIG. 5). The refrigerant flowing into the outside heat exchanger 20 absorbs heat from the outside air blown by the blower fan (point b3 to point b4 of FIG. 5).

In contrast, the refrigerant flowing into the cooling expansion valve 22a is decompressed to be the low-pressure refrigerant and then flows into the inside evaporator 23 (point b2 to point b5 of FIG. 5). The refrigerant flowing into the inside evaporator 23 absorbs heat from the air and evaporates (point b5 to point b6 of FIG. 5). Accordingly, the air sent to the passenger compartment is cooled.

The refrigerant flowing into the inside evaporator 23 flows into the constant pressure valve 27. Accordingly, the pressure of the refrigerant in the inside evaporator 23 is adjusted to be the predetermined pressure by the constant pressure valve 27 (point b7 to point b8 of FIG. 5). The refrigerant flowing out of the outside heat exchanger 20 and the refrigerant flowing out of the constant pressure valve 27 join together on the inlet side of the accumulator 24 (point b4 to point b8, point b7 to point b8 of FIG. 5), and the refrigerant flows from the accumulator 24 to the suction side of the compressor 11 and is compressed again by the compressor 11.

In the parallel dehumidifying-heating mode, the inside condenser 12 functions as a radiator, and the outside heat exchanger 20 the inside evaporator 23 functions as evaporators. Accordingly, the heat absorption amount of the refrigerant in the outside heat exchanger 20 can be increased by decreasing the saturation temperature of the refrigerant in the outside heat exchanger 20 with the increase of the target condenser temperature TAVO. According to this, the radiation amount of the refrigerant in the inside condenser 12 is increased to increase the heating capacity.

Accordingly, in the parallel dehumidifying-heating mode, dehumidification and heating can be performed by blowing the air cooled and dehumidified by the inside evaporator 23 after reheating by the inside condenser 12. Since the saturation temperature (i.e. evaporation temperature) of the refrigerant in the outside heat exchanger 20 can be decreased to be lower than the saturation temperature (i.e. evaporation temperature) of the refrigerant in the inside evaporator 23, the heating capacity of the air can be higher than that in the series dehumidifying-heating mode.

(d) Heating Mode

In the heating mode, the controller 40 controls: the high-stage side expansion valve 13a to be in a throttle state where the high-stage side expansion valve 13a exerts a decompression function; the cooling expansion valve 22a to be fully closed; the low-pressure side on-off valve 25a to be fully opened; and the high-pressure side on-off valve 28a to be closed.

According to this, in the heating mode, the vapor compression type refrigeration cycle is formed, in which the refrigerant flows through, in order, the discharge port 11c of the compressor 11, the inside condenser 12, the high-stage side expansion valve 13a, the outside heat exchanger 20, and the suction port 11a of the compressor 11 as shown in FIG. 3.

The controller 40 controls the operation of the compressor 11 such that the temperature of the refrigerant flowing into the inside condenser 12 is the target condenser temperature TAVO. The controller 40 controls the operation of the high-stage side expansion valve 13a such that the COP of the cycle approaches its local maximum value based on the pressure of the refrigerant flowing into the high-stage side expansion valve 13a. The controller 40 moves the air mix door 34 so as to fully open the air passage on the inside condenser 12 side.

In the refrigeration cycle device in the cooling mode, the inside condenser 12 functions as a radiator, and the outside heat exchanger 20 functions as an evaporator. The heat of the refrigerant absorbed when the refrigerant evaporates in the outside heat exchanger 20 is released to the outside air in the inside condenser 12. Thereby, the air can be heated.

Accordingly, in the heating mode, the heating of the passenger compartment can be performed by blowing the air heated by the inside condenser 12 out of the passenger compartment.

In the vehicle air conditioning device 1 of the present embodiment, various cycles are formed by switching the refrigerant passage of the heat pump cycle 10 as described above, and thus cooling, heating, and dehumidifying-heating of the passenger compartment are appropriately performed.

In the vehicle air conditioning device 1 used in the hybrid vehicle as in the present embodiment, the engine exhaust heat may be occasionally insufficient as a heat source for heating. Accordingly, it can be effective that a high COP can be performed in the heating operation mode regardless of the heating load as in the heat pump cycle 10 of the present embodiment.

In the parallel dehumidifying-heating mode, since the opening degree of the high-stage side expansion valve 13a is throttled as small as possible to sufficiently decrease the temperature of the inside evaporator 23, the flow rate of the refrigerant flowing through the outside heat exchanger 20 decreases. Accordingly, the refrigerant oil may be likely to remain in the outside heat exchanger 20 without flowing out of the outside heat exchanger 20, and thus the lubricity in the compressor 11 may be deteriorated.

Figure 6:
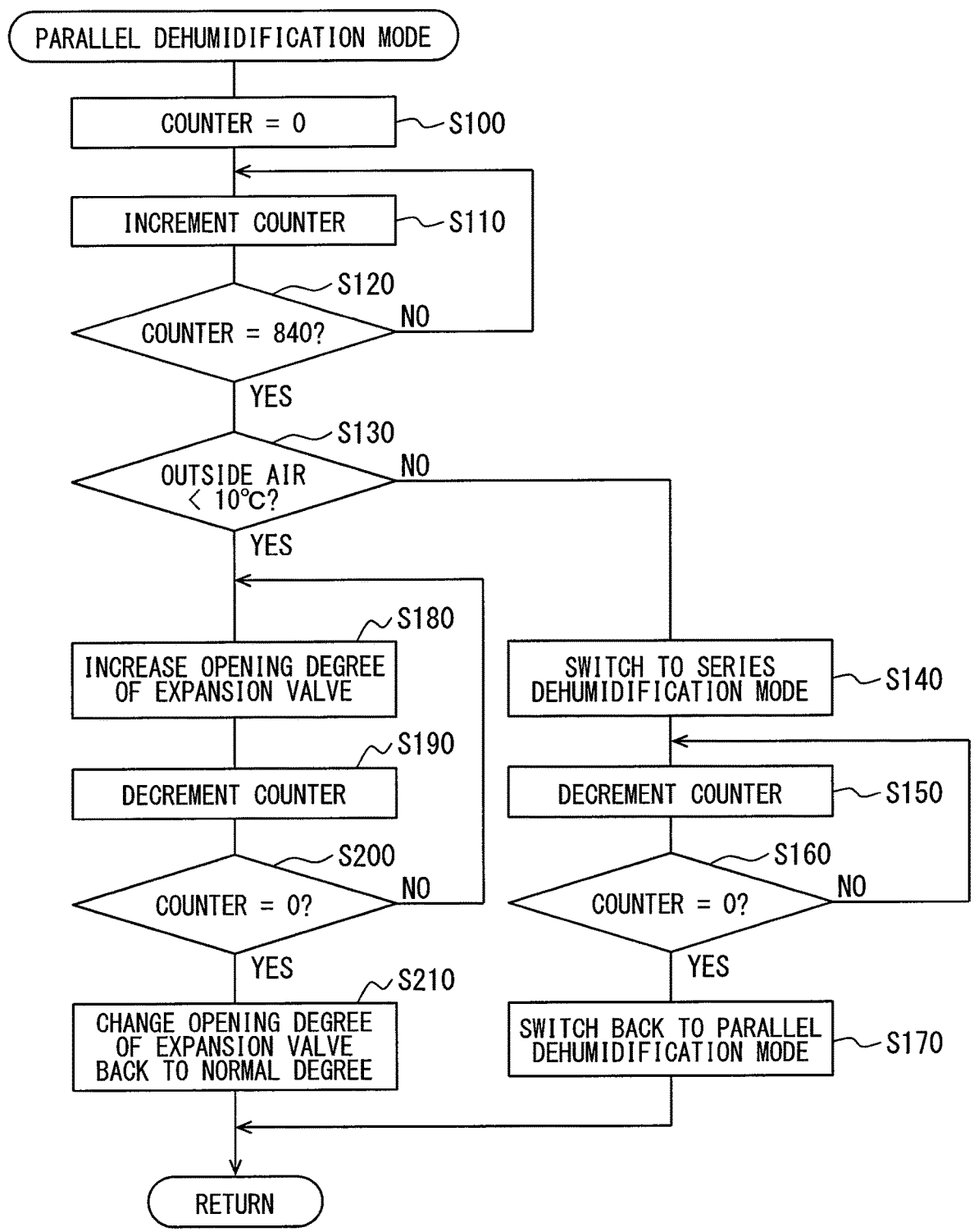
FIG. 6 is a flowchart illustrating a control process of the heat pump cycle according to the embodiment.

In the parallel dehumidifying-heating mode, the controller 40 limits the refrigerant oil from remaining in the outside heat exchanger 20 by performing the control process shown in the flowchart of FIG. 6.

The control process shown in the flowchart of FIG. 6 is executed as a subroutine for the main routine of the air-conditioning control program.

In step S100, a value of a counter is reset to 0. In subsequent step S110, a predetermined count is added to the value of the counter. An example of the predetermined count is shown in the control map of FIG. 7. When the outside air temperature is at or below 5 degrees Celsius, 0.23 count/sec is added. When the outside air temperature is between 5 degrees Celsius and 25 degrees Celsius, the count is increased with the increase of the outside air temperature within a range between 0.23 and 1 count/sec. For example, when the outside air temperature is at 10 degrees Celsius, 0.45 count/sec is added. When the outside air temperature is at or above 25 degrees Celsius, 1 count/sec is added.

In subsequent step S120, it is determined whether the value of the counter has reached 840. For example, according to FIG. 7, when the outside air temperature is at 5 degrees Celsius, the counter reaches 840 counts 60.8 minutes after switching to the parallel dehumidifying-heating mode. When the outside air temperature is at 10 degrees Celsius, the counter reaches 840 counts 31.1 minutes after switching to the parallel dehumidifying-heating mode. When the outside air temperature is at 25 degrees Celsius, the counter reaches 840 counts 14 minutes after switching to the parallel dehumidifying-heating mode. That is, when the outside air temperature is low, the time length for reaching 840 counts is longer.

When it is determined that the value of the counter has not reached 840 counts in step S120, it is determined that "oil stay" does not occur, and the process returns to step S100. The oil stay means a situation where the refrigerant oil stays in the outside heat exchanger 20 and the refrigerant oil does not sufficiently return from the outside heat exchanger 20 to the compressor 11. The oil stay may mean a situation where the refrigerant oil stays in the outside heat exchanger 20 and the amount of the refrigerant oil flowing from the outside heat exchanger 20 to the compressor 11 is insufficient.

In contrast, when it is determined that the value of the counter has reached 840 counts in step S120, it is determined that the oil stay occurs, and the process proceeds to step S130.

Figure 7:
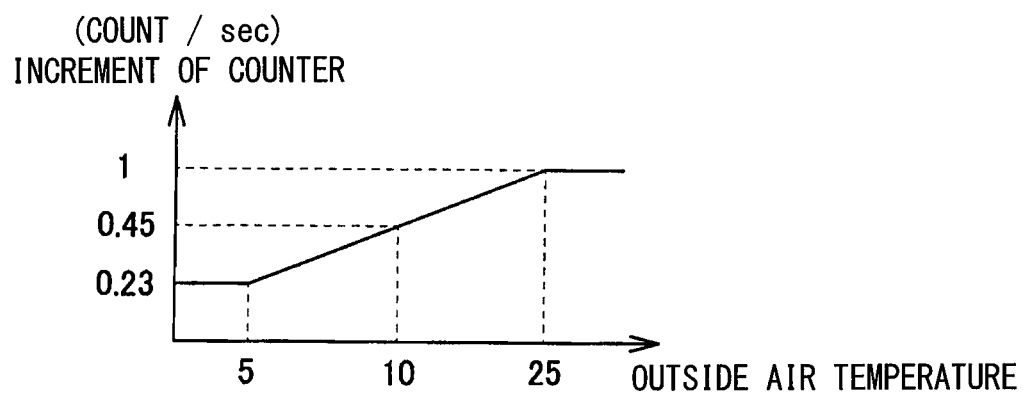
FIG. 7 is a control characteristic diagram used in the control process of the heat pump cycle according to the embodiment.

For example, when the predetermined count is determined based according to FIG. 7, the time length for reaching 840 counts, i.e. the time when the oil stay is determined, is determined as follows.

When the outside air temperature is at 5 degrees Celsius, it is determined that 840 counts is reached and the oil stay occurs 60.8 minutes after switching to the parallel dehumidifying-heating mode. When the outside air temperature is at 10 degrees Celsius, it is determined that 840 count has reached and the oil stay occurs 31.1 minutes after switching to the parallel dehumidifying-heating mode. When the outside air temperature is at 25 degrees Celsius, it is determined that 840 counts is reached and the oil stay occurs 14 minutes after switching to the parallel dehumidifying-heating mode.

That is, when the outside air temperature is low, the time length from switching to the parallel dehumidifying-heating mode to the determination of the oil stay is long. The reasons are described below.

In the parallel dehumidifying-heating mode, the outside heat exchanger 20 functions as an evaporator. The vapor quality of the refrigerant at the outlet of the outside heat exchanger 20 decreases as the outside air temperature is lower. When the vapor quality of the refrigerant is small, the amount of the refrigerant oil dissolved in the refrigerant and returning to the compressor increases, and accordingly the time length for occurring the oil stay is longer.

In view of this point, the time length for determining the oil stay after switching to the parallel dehumidifying-heating mode is elongated by decreasing the count added every second when the outside air temperature is low.

In subsequent step S130, it is determined whether the outside air temperature is lower than 10 degrees Celsius. When it is determined that the outside air temperature is not lower than 10 degrees Celsius, the process proceeds to step S140, and the refrigerant oil return is performed by switching to the series dehumidifying-heating mode. The refrigerant oil return means an operation in which the refrigerant oil remaining in the outside heat exchanger 20 is returned to the compressor 11. Since the flow rate of the refrigerant flowing through the outside heat exchanger 20 increases by switching to the series dehumidifying-heating mode, the refrigerant oil remaining in the outside heat exchanger 20 can be returned to the compressor 11.

In subsequent step S150, 4 count/sec is subtracted from the value of the counter. In subsequent step S160, it is determined whether the value of the counter has reached 0. In the present embodiment, since 4 count/sec is subtracted, the value of the counter reaches 0 count 210 seconds after switching to the series dehumidifying-heating mode in step S140.

When it is determined that the value of the counter has not reached 0 count in step S160, it is determined that the refrigerant oil return has not completed, and the process returns to step S150.

In contrast, when it is determined that the value of the counter has reached 0 in step S160, it is determined that the refrigerant oil return has completed, and the process proceeds to step S170. Further, the air-conditioning control program returns to the main routine after switching to the parallel dehumidifying-heating mode. That is, it is determined that the refrigerant oil return has completed 210 seconds after switching to the series dehumidifying-heating mode, and then the operation mode is switched to the parallel dehumidifying-heating mode.

In contrast, when it is determined that the outside air temperature is lower than 10 degrees Celsius in step S130, the process proceeds to step S180, and the parallel dehumidifying-heating mode is continued and the opening degree of the high-stage side expansion valve 13a is increased. For example, the refrigerant oil return is performed by increasing the opening degree of the high-stage side expansion valve 13a by 5% larger than the normal opening degree for 10 seconds, and then the opening degree of the high-stage side expansion valve 13a is returned to the normal opening degree for 60 seconds. That is, in step S180, the opening degree of the high-stage side expansion valve 13a is periodically increased. The normal opening degree may mean the opening degree of the high-stage side expansion valve 13a before increasing the opening degree of the high-stage side expansion valve 13a.

Since the flow rate of the refrigerant flowing through the outside heat exchanger 20 increases by increasing the opening degree of the high-stage side expansion valve 13a, the refrigerant oil remaining in the outside heat exchanger 20 can be returned to the compressor 11. Destabilization of the cycle due to increase of the temperature of the inside evaporator 23 can be suppressed by periodically returning the opening degree of the high-stage side expansion valve 13a to the normal opening degree.

Since the heating capacity is lower in the series dehumidifying-heating mode than in the parallel dehumidifying-heating mode, it may be difficult to maintain a blowing temperature TAV to the target blowing temperature TAVO if the refrigerant oil return is performed in the series dehumidifying-heating mode when the outside air temperature is lower than 10 degrees Celsius.

Accordingly, when it is determined that the outside air temperature is lower than 10 degrees Celsius in step S180, the opening degree of the high-stage side expansion valve 13a is increased with continuing the parallel dehumidifying-heating mode higher in the heating capacity than the series dehumidifying-heating mode, and thus the refrigerant oil return can be performed with maintaining the blowing temperature TAV to the target blowing temperature TAVO.

In subsequent step S190, 210 counts are subtracted from the value of the counter. In subsequent step S200, it is determined whether the value of the counter has reached 0. In the present embodiment, the value of the counter becomes 0 by performing the increasing of the opening degree of the high-stage side expansion valve 13a in step S180 four times.

When it is determined that the value of the counter has not reached 0 count in step S200, it is determined that the refrigerant oil return has not completed, and the process returns to step S180.

In contrast, when it is determined that the value of the counter has reached 0 in step 200, it is determined that the refrigerant oil return has completed, and the process proceeds to step S210. Further, the air-conditioning control program returns to the main routine after returning the opening degree of the high-stage side expansion valve 13a to the normal opening degree.

In the present embodiment, as described in steps S120 and S140, the controller 40 controls the low-pressure side on-off valve 25a and the high-pressure side on-off valve 28a to switch to the series dehumidifying-heating mode when it is determined that the refrigerant oil does not sufficiently return from the outside heat exchanger 20 to the compressor 11 in the parallel dehumidifying-heating mode.

By switching from the parallel dehumidifying-heating mode to the series dehumidifying-heating mode, the amount of the refrigerant flowing through the outside heat exchanger 20 increases, and accordingly the refrigerant oil in the outside heat exchanger 20 is likely to return to the compressor 11. Accordingly, the refrigerant oil can be limited from remaining in the outside heat exchanger 20.

In the present embodiment, as described in steps S120 and S180, the controller 40 increases the opening degree of the high-stage side expansion valve 13a when it is determined that the refrigerant oil does not sufficiently return from the outside heat exchanger 20 to the compressor 11.

According to this, since the flow rate of the refrigerant flowing through the outside heat exchanger 20 is increased by increasing the opening degree of the high-stage side expansion valve 13a, the refrigerant oil can be likely to return from the outside heat exchanger 20 to the compressor 11. Accordingly, the refrigerant oil can be limited from remaining in the outside heat exchanger 20.

In the present embodiment, as described in steps S120 to S140 and S180, when it is determined that the refrigerant oil does not sufficiently return from the outside heat exchanger 20 to the compressor 11 in the parallel dehumidifying-heating mode, the controller 40 (i) controls the low-pressure side on-off valve 25a and the high-stage side expansion valve 28a to switch to the series dehumidifying-heating mode when the outside heat exchanger is higher than the predetermined temperature, and (ii) increases the opening degree of the high-stage side expansion valve 13a when the outside air temperature is lower than the predetermined temperature with maintaining the parallel dehumidifying-heating mode.

According to this, since the operation mode is switched to the series dehumidifying-heating mode when the outside air temperature is high, the refrigerant oil can be surely prevented from remaining in the outside heat exchanger 20.

In contrast, since the opening degree of the high-stage side expansion valve 13a is increased with maintaining the parallel dehumidifying-heating mode when the outside air temperature is low, deficiency of the air heating capacity of the radiator 12 can be suppressed with suppressing the remaining of the refrigerant oil in the outside heat exchanger 20.

In the present embodiment, as described in steps S110 and S120, the controller 40 determines that the refrigerant oil does not sufficiently return from the outside heat exchanger 20 to the compressor 11 when the predetermined time elapsed after starting the parallel dehumidifying-heating mode.

According to this, since the refrigerant oil can be timely returned from the outside heat exchanger 20 to the compressor 11, the refrigerant oil can be appropriately prevented from remaining in the outside heat exchanger 20.

As described above, the vapor quality of the refrigerant at the outlet of the outside heat exchanger 20 decreases with decrease of the outside air temperature. When the vapor quality of the refrigerant is small, the amount of the refrigerant oil dissolved in the refrigerant and returning to the compressor increases, and accordingly the time length for occurring the oil stay is longer.

In view of this point, in the present embodiment, the controller 40 increases the predetermined time as the outside air temperature is lower, as described in steps S110 and S120.

Accordingly, since the refrigerant oil can be timely returned from the outside heat exchanger 20 to the compressor 11, the refrigerant oil can be appropriately prevented from remaining in the outside heat exchanger 20.

In the present embodiment, as described in step S180, when the controller 40 increases the opening degree of the high-stage side expansion valve 13a and determines that the refrigerant oil does not sufficiently return from the outside heat exchanger 20 to the compressor 11, the controller 40 periodically returns the opening degree of the high-stage side expansion valve 13a to the normal opening degree.

According to this, the deficiency of the air heating capacity of the radiator 12 can be suppressed even when the opening degree of the high-stage side expansion valve 13a is increased for returning the refrigerant oil from the outside heat exchanger 20 to the compressor 11.

The above-described embodiments can be variously modified as follows.

In the steps S140 to S170 of the above-described embodiment, when the refrigerant oil return is completed by the series dehumidifying-heating mode, the refrigerant oil return is ended by returning the operation mode to the parallel dehumidifying-heating mode. However, after the refrigerant oil return by the series dehumidifying-heating mode is completed, the series dehumidifying-heating mode may be continued when the blowing temperature TAV can be maintained to be the target blowing temperature TAVO with the series dehumidifying-heating mode instead of returning to the parallel dehumidifying-heating mode, and the operation mode may be returned to the parallel dehumidifying-heating mode for maintain the blowing temperature TAV to be the target blowing temperature TAVO when the blowing temperature TAV cannot be maintained to be the target blowing temperature TAVO with the series dehumidifying-heating mode.

In the above-described embodiment, an example where the heat pump cycle 10 is used in the vehicle air conditioning device 1 of the hybrid vehicle is described. However, the heat pump cycle 10 of the present disclosure may be used in a vehicle air conditioning device of an electric vehicle that obtains a driving force for traveling from an electric motor for vehicle travelling. The heat pump cycle 10 may be used in a stationary air-conditioning device, for example.

In the above-described embodiment, an example where the operation mode is switched by executing the air-conditioning control program. However, the switching of the operation mode is not limited this specific example. For example, the operation mode may be switched with reference to a control map preliminarily stored in the controller based on the target flow-out temperature TAO and the outside air temperature Tam.

The cooling mode, the series dehumidifying-heating mode, the parallel dehumidifying-heating mode, and the heating mode may be switched based on operation signals from an operation mode switch that may be provided on the operation panel.

Although the present disclosure has been described in accordance with the examples, it is understood that the present disclosure is not limited to the above examples or structures. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

What is claimed is:

1. A vehicle air conditioning device comprising:
   a compressor that draws, compresses, and discharges a refrigerant containing a refrigerant oil;
   a radiator that heats air by exchanging heat between the refrigerant discharged from the compressor and the air sent into a passenger compartment;
   an outside heat exchanger that exchanges heat between the refrigerant flowing out of the radiator and outside air;
   an evaporator that evaporates the refrigerant by exchanging heat between the refrigerant flowing out of the outside heat exchanger and the air flowing into the radiator;
   a first decompressor that decompresses the refrigerant flowing out of the radiator;
   a second decompressor that decompresses the refrigerant flowing out of the outside heat exchanger;
   a switching portion that switches between
      a series dehumidifying-heating mode in which the outside heat exchanger and the evaporator are connected in series with each other with respect to a flow of the refrigerant, and
      a parallel dehumidifying-heating mode in which the outside heat exchanger and the evaporator are connected in parallel with each other with respect to the flow of the refrigerant; and
   a controller configured to control the switching portion to switch from the parallel dehumidifying-heating mode to the series dehumidifying-heating mode when the controller determines that an amount of the refrigerant oil flowing from the outside heat exchanger to the compressor is insufficient.

2. The vehicle air conditioning device according to claim 1, wherein
   the controller is configured to control an opening degree of the first decompressor, and
   the controller controls the switching portion to switch from the parallel dehumidifying-heating mode to the series dehumidifying-heating mode when
      the controller determines that the amount of the refrigerant oil flowing from the outside heat exchanger to the compressor is insufficient during the parallel dehumidifying-heating mode and
      a temperature of the outside air is higher than a predetermined temperature, and
   the controller maintains the parallel dehumidifying-heating mode and increases the opening degree of the first decompressor when
      the controller determines that the amount of the refrigerant oil flowing from the outside heat exchanger to the compressor is insufficient during the parallel dehumidifying-heating mode and
      the temperature of the outside air is lower than the predetermined temperature.

3. The vehicle air conditioning device according to claim 1, wherein
   the controller determines that the amount of the refrigerant oil flowing from the outside heat exchanger to the compressor is insufficient when a predetermined time elapses since the parallel dehumidifying-heating mode is started.

4. The vehicle air conditioning device according to claim 3, wherein
   the controller elongates the predetermined time as a temperature of the outside air is lower.

* * * * *